United States Patent
Kim et al.

(10) Patent No.: US 9,161,058 B2
(45) Date of Patent: Oct. 13, 2015

(54) METHOD AND SYSTEM FOR DETECTING GLOBAL BRIGHTNESS CHANGE FOR WEIGHTED PREDICTION IN VIDEO ENCODING

(75) Inventors: Hyung Joon Kim, McKinney, TX (US); Do-Kyoung Kwon, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 812 days.

(21) Appl. No.: 12/748,396

(22) Filed: Mar. 27, 2010

(65) Prior Publication Data

US 2011/0235708 A1    Sep. 29, 2011

(51) Int. Cl.
| | |
|---|---|
| *H04N 7/32* | (2006.01) |
| *H04N 19/82* | (2014.01) |
| *H04N 19/105* | (2014.01) |
| *H04N 19/159* | (2014.01) |
| *H04N 19/172* | (2014.01) |
| *H04N 19/117* | (2014.01) |
| *H04N 19/137* | (2014.01) |

(52) U.S. Cl.
CPC ............. *H04N 19/82* (2014.11); *H04N 19/105* (2014.11); *H04N 19/117* (2014.11); *H04N 19/137* (2014.11); *H04N 19/159* (2014.11); *H04N 19/172* (2014.11)

(58) Field of Classification Search
CPC . H04N 19/105; H04N 19/117; H04N 19/137; H04N 19/159; H04N 19/172; H04N 19/82
USPC ........................................ 375/240.12, E7.243
See application file for complete search history.

(56) References Cited

U.S. PATENT DOCUMENTS

| | | | |
|---|---|---|---|
| 7,010,047 B2 * | 3/2006 | Amara et al. ............ | 375/240.29 |
| 2006/0093038 A1 | 5/2006 | Boyce | |
| 2006/0198440 A1 | 9/2006 | Yin et al. | |
| 2006/0268166 A1 * | 11/2006 | Bossen et al. .............. | 348/390.1 |
| 2008/0198927 A1 | 8/2008 | Wu | |
| 2008/0253456 A1 | 10/2008 | Yin et al. | |
| 2008/0291333 A1 * | 11/2008 | Subbotin et al. .............. | 348/700 |
| 2009/0034854 A1 | 2/2009 | Lee et al. | |
| 2010/0253835 A1 * | 10/2010 | Zhou et al. .................... | 348/441 |

OTHER PUBLICATIONS

"Global Brightness-Variation Compensation for Video Coding", IEEE Transactions On Circuits And Systems For Video Technology, vol. 8, No. 8, Dec. 1998 to Kamikura et al.*

(Continued)

*Primary Examiner* — Mohammed Rahaman
(74) *Attorney, Agent, or Firm* — Alan A. R. Cooper; Frank D. Cimino (57) ABSTRACT

A method of encoding a coding unit of a digital video sequence is provided that includes computing a brightness measure for each region in a plurality of regions in the coding unit, wherein the brightness measure indicates a relative brightness between the region in the coding unit and a corresponding region in a reference coding unit, determining a number of regions in the plurality of regions with significant brightness change by comparing each brightness measure to a region brightness change threshold, detecting whether there is global brightness change in the coding unit by comparing the number of regions to a global brightness threshold, and when global brightness change is detected, computing weighted prediction factors to be used for weighted prediction in encoding the coding unit.

10 Claims, 5 Drawing Sheets

(56) References Cited

OTHER PUBLICATIONS

Accurate parameter estimation and efficient fade detection for weighted prediction in h.264 video compression, Zhang et al. IEEE 2008.*

Aoki, H.; Miyamoto, Y.; , "An H.264 weighted prediction parameter estimation method for fade effects in video scenes," Image Processing, 2008. ICIP 2008. 15th33 IEEE International Conference on , vol., no., pp. 2112-2115, Oct. 12-15, 2008.*

H. Kato and Y. Nakajima, "Weighting Factor Determination Algorithm for H.264/MPEG-4 AVC Weighted Prediction", IEEE 6th Workshop on Multimedia Signal Processing, Siena, Italy, Sep. 29-Oct. 1, 2004, pp. 27-30.

J.M. Boyce, "Weighted Prediction in the H.264/MPEG AVC Video Coding Standard", 2004 IEEE International Sypmosium on Circuits and Systems, Vancouver, BC, Canada, May 23-26, 2004, pp. 789-792.

A.M. Tourapis et al., "H.264/14496-10 AVC Reference Software Manual" Joint Video Team (JVT) of ISO/IEC MPEG & ITU-T VCEG, London, UK, Jun. 28-Jul. 3, 2009.

H. Aoki and Y. Miyamoto, "An H.264 Weighted Prediction Parameter Estimation Method for Fade Effects in Video Scenes", 2008 IEEE International Conference on Image Processing, San Diego, CA, Oct. 12-15, 2008, pp. 2112-2115.

* cited by examiner

METHOD AND SYSTEM FOR DETECTING GLOBAL BRIGHTNESS CHANGE FOR WEIGHTED PREDICTION IN VIDEO ENCODING

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. In general, the encoding process of video compression generates coded representations of frames or subsets of frames. The encoded video bitstream, i.e., encoded video sequence, may include three types of frames: intracoded frames (I-frames), predictive coded frames (P-frames), and bi-directionally coded frames (B-frames). I-frames are coded without reference to other frames. P-frames are coded using motion compensated prediction from I-frames or P-frames. B-frames are coded using motion compensated prediction from both past and future reference frames. For encoding, all frames are divided into smaller blocks, e.g., 16×16 macroblocks of pixels in the luminance space and 8×8 macroblocks of pixels in the chrominance space for the simplest sub-sampling format.

Video coding standards (e.g., MPEG, H.264, etc.) are based on the hybrid video coding technique of block motion compensation and transform coding. Block motion compensation is used to remove temporal redundancy between adjacent frames in a video sequence and transform coding is used to remove spatial redundancy in the video sequence. Traditional block motion compensation schemes basically assume that objects in a scene undergo a displacement in the x- and y-directions from one frame to the next. Motion vectors are signaled from the encoder to the decoder to describe this motion. The decoder then uses the motion vectors to predict current frame data from previous reference frames.

This simple interframe coding technique does not consistently provide sufficient coding efficiency for many applications when there is temporal brightness variation across sequences of frames. Some video standards (e.g., H.264/AVC) provide for both implicit and explicit weighted prediction to help compensate for temporal brightness variation, which may provide enhanced coding efficiency for sequences with fades, lighting changes, etc. More specifically, weighted prediction (WP) provides for modification of motion-compensated prediction signals using weighting factors, e.g., a global multiplier and a global offset. In explicit weighted prediction, applicable to both P-frames and B-frames, the weighting factors are computed in the encoder and communicated to the decoder in the coded video sequence. In implicit weighted prediction, which is typically applicable only to B-frames, the weighting factors are automatically computed during encoding based on the temporal distance between a current frame and two reference frames and need not be communicated to the decoder.

Further, in some weighted prediction techniques, each 8×8 block in P frame can have multiple candidate reference frames and the best reference frame is selected from the candidates. For a B frame, a block can have one or two (forward and backward) reference frames. When a single reference frame is used, the weighted prediction image=weight*prediction image+offset. When two reference frames are used, the weighted prediction image=average of forward weighted prediction image and backward weighted prediction image, where the forward weighted prediction image=forward weight*forward prediction image+forward offset and the backward weighted prediction image=backward weight*backward prediction image+backward offset.

The use of weighted prediction has been shown to provide coding gains for sequences of frames with global brightness changes. However, it has also been shown to result in coding losses for sequences of frames without global brightness changes.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Further, embodiments of the invention should not be considered limited to any particular video coding standard. In addition, for convenience in describing some embodiments of the invention, the terms picture and frame are used to refer to the portion of a video sequence being encoded. A picture is defined to be an entire frame or a field in a frame and a frame of video can be considered to contain two interleaved fields, a top and a bottom field. One of ordinary skill in the art will understand embodiments of the invention that operate on other coding units of a video sequence such as, for example, a slice, a video object plane, etc., that may be intracoded or predictively coded.

In general, embodiments of the invention provide for detecting global brightness change in pictures during encoding of a video sequence based on brightness measures computed for the pictures. Brightness in a picture may be changed by, for example, camera exposure adjustment, lighting changes, and transition fades. Further brightness changes may occur for an entire picture, i.e., global brightness change, or for a partial area in a picture, i.e., local brightness change. In general, in one or more embodiments of the invention, a current input picture and a reference picture are divided into regions and brightness measures are computed for the regions in both pictures. The number of regions in the current frame having brightness measures that indicate a significant brightness change as compared to the brightness measures of corresponding regions in the reference frame are counted. If this count exceeds a predetermined global brightness threshold, the current input frame is deemed to have a global brightness change. In one or more embodiments of the invention, if a global brightness change is detected, weighted prediction factors are computed and weighted prediction is applied during encoding of the picture. Otherwise, weighted prediction is not applied during encoding of the picture. Evaluations of this technique for selective application of weighted prediction based on detecting global brightness change have shown that the technique reduces the average quality loss that occurs when weighted prediction is applied to every picture.

Figure 1:
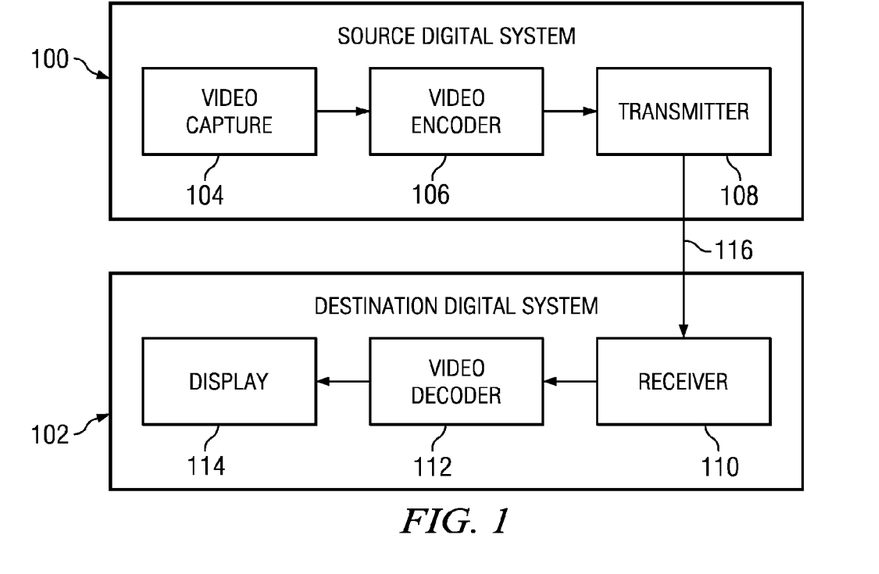
FIG. 1 shows a block diagram of a digital system in accordance with one or more embodiments of the invention.

FIG. 1 shows a block diagram of a digital system in accordance with one or more embodiments of the invention. The digital system is configured to perform coding of digital video sequences using embodiments of the methods described herein. The system includes a source digital system (100) that transmits encoded video sequences to a destination digital system (102) via a communication channel (116). The source digital system (100) includes a video capture component (104), a video encoder component (106) and a transmitter component (108). The video capture component (104) is configured to provide a video sequence to be encoded by the video encoder component (106). The video capture component (104) may be for example, a video camera, a video archive, or a video feed from a video content provider. In some embodiments of the invention, the video capture component (104) may generate computer graphics as the video sequence, or a combination of live video and computer-generated video.

The video encoder component (106) receives a video sequence from the video capture component (104) and encodes it for transmission by the transmitter component (1108). In general, the video encoder component (106) receives the video sequence from the video capture component (104) as a sequence of frames, divides the frames into coding units (e.g., pictures) which may be a whole frame or a part of a frame, divides the coding units into blocks of pixels (e.g., macroblocks), and encodes the video data in the coding units based on these blocks. During the encoding process, a method for selective weighted prediction in accordance with one or more of the embodiments described herein may be used. The functionality of embodiments of the video encoder component (106) is described in more detail below in reference to FIG. 2.

The transmitter component (108) transmits the encoded video data to the destination digital system (102) via the communication channel (116). The communication channel (116) may be any communication medium, or combination of communication media suitable for transmission of the encoded video sequence, such as, for example, wired or wireless communication media, a local area network, or a wide area network.

The destination digital system (102) includes a receiver component (110), a video decoder component (112) and a display component (114). The receiver component (110) receives the encoded video data from the source digital system (100) via the communication channel (116) and provides the encoded video data to the video decoder component (112) for decoding. In general, the video decoder component (112) reverses the encoding process performed by the video encoder component (106) to reconstruct the frames of the video sequence. The reconstructed video sequence may then be displayed on the display component (114). The display component (114) may be any suitable display device such as, for example, a plasma display, a liquid crystal display (LCD), a light emitting diode (LED) display, etc.

In some embodiments of the invention, the source digital system (100) may also include a receiver component and a video decoder component and/or the destination digital system (102) may include a transmitter component and a video encoder component for transmission of video sequences both directions for video steaming, video broadcasting, and video telephony. Further, the video encoder component (106) and the video decoder component (112) may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (106) and the video decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
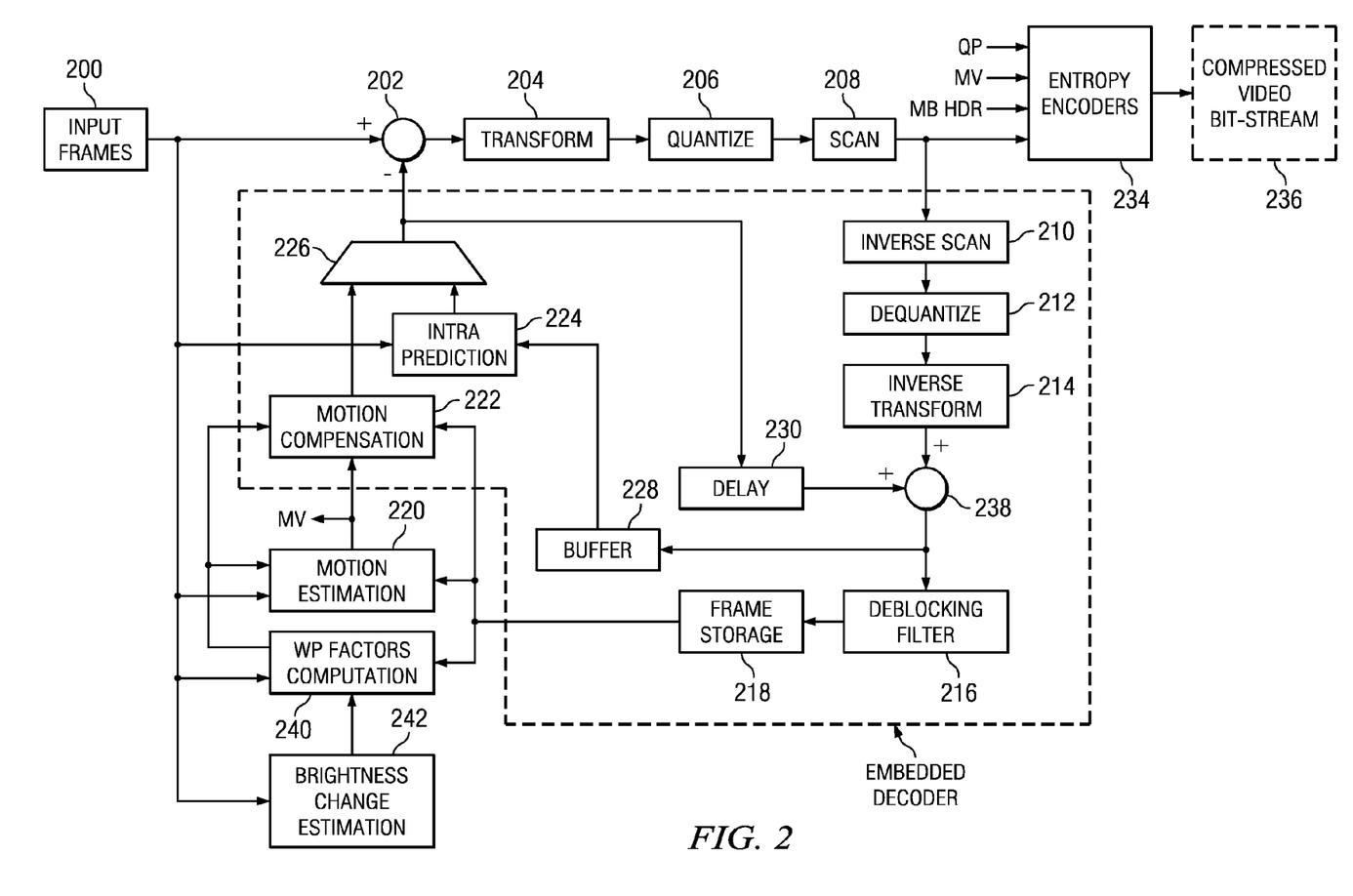
FIG. 2 shows a block diagram of a video encoder in accordance with one or more embodiments of the invention.

FIG. 2 shows a block diagram of a video encoder, e.g., the video encoder (114) of FIG. 1, configured to perform weighted prediction (WP) in accordance with one or more embodiments of the invention. More specifically, FIG. 2 illustrates the basic coding architecture of an H.264 encoder. In the video encoder of FIG. 2, input frames (200) for encoding are provided as one input of a motion estimation component (220), as one input of an intraframe prediction component (224), as one input of a brightness change estimation component (242), as one input of a WP factors computation component (240), and to a positive input of a combiner (202) (e.g., adder or subtractor or the like).

The frame storage component (218) provides reference data to the motion estimation component (220), to the motion compensation component (222), and to the WP factors computation component (240). The reference data may include one or more previously encoded and decoded frames, i.e., reconstructed frames.

The brightness change estimation component (242) provides an indication to the WP factors computation component (240) as to whether or not weighted prediction is to be used. More specifically, the brightness change estimation component (242) detects whether or not there is global brightness change in an input picture as compared to a reference picture, and indicates that weighted prediction is to be used if global brightness change is detected. A method for detecting global brightness change is described in reference to FIG. 3 below.

The WP factors computation component (220) provides WP factors, e.g., a global multiplier and a global offset, to the motion estimation component (220) and the motion compensation component (222). If the brightness change estimation component (242) indicates that WP is to be applied, the WP factors computation component (220) computes the WP factors to be used for encoding the input frame using the reference frame. Any suitable technique for computing the WP factors may be used such as, for example, linear regression, estimating the factors as the ratio between the average value of the pixels in the current frame divided by the average value of the pixels in the reference frame, histogram methods, and weighted parameter estimation in the presence of cross-fades using displaced differences. In one or more embodiments of the invention, a technique as described in H. Aoki and Y. Miyamoto, "An H.264 Weighted Prediction Parameter Estimation Method for Fade Effects in Video Scenes," ICIP 2008, pp. 2112-2115 ("Aoki"), is used. This paper is incorporated by reference herein. If the brightness change estimation component (242) indicates that WP is not to be performed, the WP factors computation component (220) provides values for the weighted prediction factors that will have no effect when applied. These values may be, for example, default values such as a zero value offset and a weighting factor equivalent to a scaling factor of 1.

The motion estimation component (220) provides motion estimation information to the motion compensation component (222) and the entropy encoders (234). More specifically, the motion estimation component (220) performs tests based on the prediction modes defined in the H.264 standard and the weighted prediction factors to choose the best motion vector(s)/prediction mode. The motion estimation component (220) provides the selected motion vector (MV) or vectors and the selected prediction mode to the motion compensation component (222) and the selected motion vector (MV) to the entropy encoders (234).

The motion compensation component (222) provides motion compensated prediction information to a selector switch (226) that includes motion compensated interframe prediction macroblocks (MBs). The motion compensation component (222) also applies the weighting factors to the motion compensated prediction information. The intraframe prediction component (224) also provides intraframe prediction information to switch (226) that includes intraframe prediction MBs and a prediction mode. That is, similar to the motion estimation component (220), the intraframe prediction component (224) performs tests based on prediction modes defined in the H.264 standard to choose the best prediction mode for generating the intraframe prediction MBs.

The switch (226) selects between the motion-compensated interframe prediction MBs from the motion compensation component (222) and the intraframe prediction MBs from the intraprediction component (224) based on the selected prediction mode. The output of the switch (226) (i.e., the selected prediction MB) is provided to a negative input of the combiner (202) and to a delay component (230). The output of the delay component (230) is provided to another combiner (i.e., an adder) (238). The combiner (202) subtracts the selected prediction MB from the current MB of the current input frame to provide a residual MB to the transform component (204). The resulting residual MB is a set of pixel difference values that quantify differences between pixel values of the original MB and the prediction MB. The transform component (204) performs a block transform such as DCT, on the residual MB to convert the residual pixel values to transform coefficients and outputs the transform coefficients.

The transform coefficients are provided to a quantization component (206) which outputs quantized transform coefficients. Because the DCT transform redistributes the energy of the residual signal into the frequency domain, the quantized transform coefficients are taken out of their raster-scan ordering and arranged by significance, generally beginning with the more significant coefficients followed by the less significant by a scan component (208). The ordered quantized transform coefficients provided via a scan component (208) are coded by the entropy encoder (234), which provides a compressed bitstream (236) for transmission or storage. The entropy coding performed by the entropy encoder (234) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients provided via the scan component (208) are returned to their original post-DCT arrangement by an inverse scan component (210), the output of which is provided to a dequantize component (212), which outputs estimated transformed information, i.e., an estimated or reconstructed version of the transform result from the transform component (204). The estimated transformed information is provided to the inverse transform component (214), which outputs estimated residual information which represents a reconstructed version of the residual MB. The reconstructed residual MB is provided to the combiner (238).

The combiner (238) adds the delayed selected predicted MB to the reconstructed residual MB to generate an unfiltered reconstructed MB, which becomes part of reconstructed frame information. The reconstructed frame information is provided via a buffer (228) to the intraframe prediction component (224) and to a filter component (216). The filter component (216) is a deblocking filter (e.g., per the H.264 specification) which filters the reconstructed frame information and provides filtered reconstructed frames, i.e., reference data or reference frames, to frame storage component (218).

Figure 3:
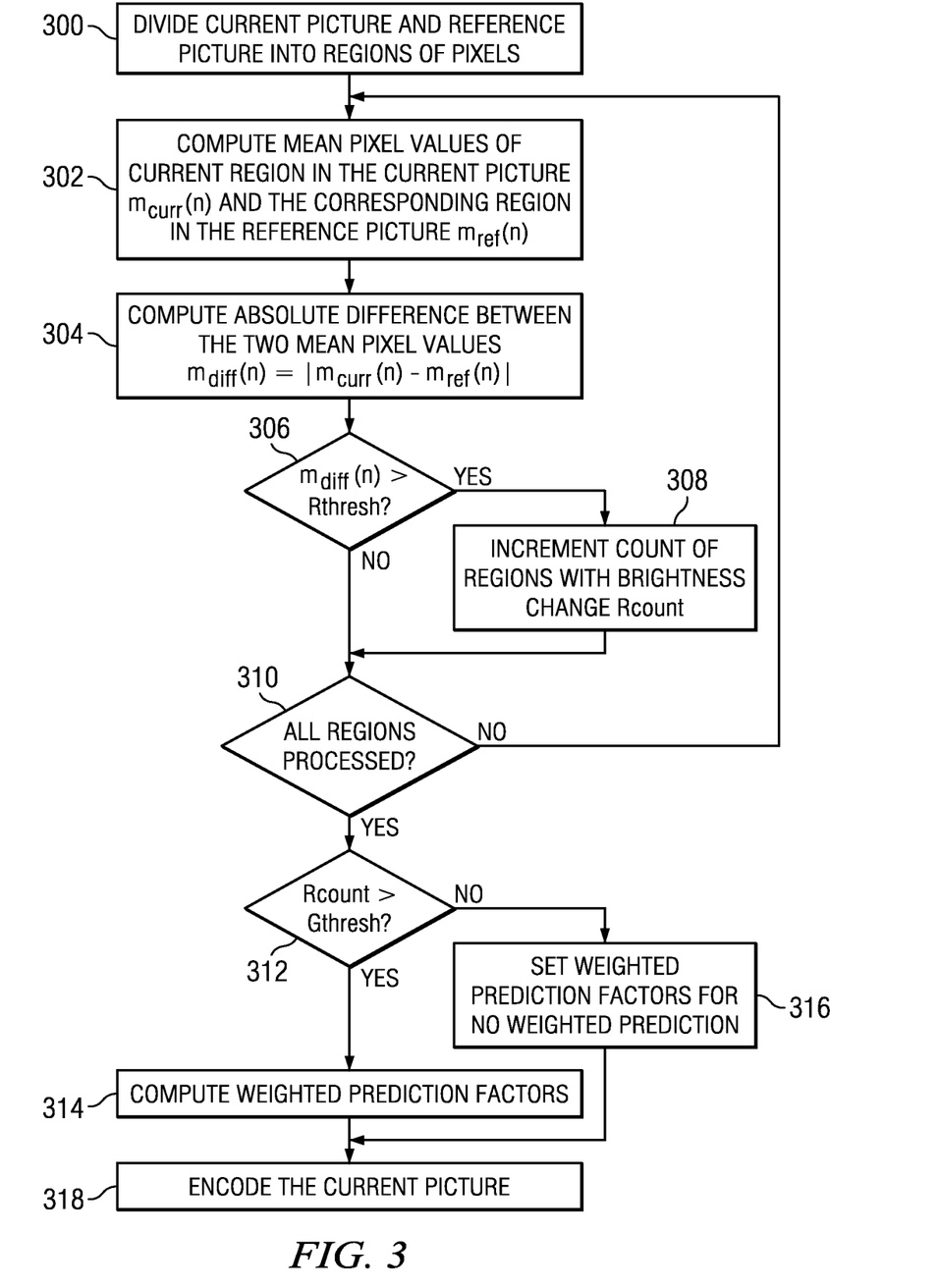
FIG. 3 shows a flow diagram of a method in accordance with one or more embodiments of the invention.

FIG. 3 is a flow graph of a method for detecting global brightness change for weighted prediction during encoding of a digital video sequence in accordance with one or more embodiments of the invention. The method of FIG. 3 is performed for an input picture of a video sequence prior to motion estimation and motion compensation. Further, in some embodiments of the invention, the method is performed for input pictures to be encoded a P-pictures or B-pictures and is not performed for input pictures to be encoded as I-pictures.

Initially, the current input picture and a reference picture are divided into N regions of pixels (300). The value of N may be any integer and may be empirically determined. Further, the N regions may be of any size and/or shape. In one or more embodiments of the invention, the number of regions is 4 and the pictures are divided into four equal size blocks of pixels. In one or more embodiments of the invention, the reference picture is a previous original input picture in the video sequence that corresponds to a reconstructed picture that will be used as a reference picture during encoding of the current input picture.

Next, the mean pixel value of a region in the current input picture, $m_{curr}(n)$, and the mean pixel value of the corresponding region in the reference picture, $m_{ref}(n)$, are computed (302). The mean pixel value may be computed by summing the pixels values of the pixels in a regions and dividing the total by the number of pixels in the region. The mean pixel values are then used to compute a brightness measure for the region in the input frame. The brightness measure indicates the relative brightness between the region and the reference region. More specifically, the brightness measure, $m_{diff}(n)$, is computed as the absolute difference between the two mean pixel values, $|m_{curr}(n)-m_{ref}(n)|$ (304).

The brightness measure, $m_{diff}(n)$, is compared to an empirically determined region brightness change threshold, Rthresh. In some embodiments of the invention, the value of Rthresh varies depending on the number of regions N. In one or more embodiments of the invention, the value of Rthresh is 2. If the brightness measure, $m_{diff}(n)$, exceeds the region brightness change threshold, Rthresh, then the region in the input picture has significant brightness change as compared to the corresponding region in the reference picture and a count of regions in the current input picture with significant brightness change, Rcount, is incremented (308). Otherwise, the count of regions is not incremented. The process of counting regions in the current input picture with significant brightness change (302-308) is repeated for all N regions in the current input picture and the reference picture (310).

After the number of regions in the current input picture with brightness change is counted, the region count, Rcount, is compared to an empirically determined global brightness threshold, Gthresh. In some embodiments of the invention, the value of Gthresh varies depending on the number of regions N. In one or more embodiments of the invention, the value of Gthresh is 3. If the region count exceeds the global brightness threshold (312), then global brightness change is detected in the current input picture and weighted prediction factors are computed (314). Otherwise, the weighted prediction factors are set so that performing weighted prediction will have no effect (316). The current input picture is then encoded (318). If weighted prediction factors were computed, weighted prediction is applied during the encoding. Otherwise, weighted prediction is not applied.

In some embodiments of the invention, in the latter case, values for the weighted prediction factors are provided that will have no effect when applied, thus effectively turning off weighed prediction. These values may be, for example, default values such as a zero value offset and a weighting factor equivalent to a scaling factor of 1. Any suitable technique for computing the weighted prediction factors may be used such as, for example, linear regression, estimating the factors as the ratio between the average value of the pixels in the current frame divided by the average value of the pixels in the reference frame, histogram methods, and weighted parameter estimation in the presence of cross-fades using displaced differences. In one or more embodiments of the invention, a technique as described in Aoki is used.

The method of FIG. 3 is described as if a single reference picture is to be used for encoding an input picture. In one or more embodiments of the invention, multiple reference pictures may be used for encoding a single input picture. In such embodiments, steps 300-316 are repeated for each reference picture to set the weighted prediction factors for each reference picture. For example, if the input picture is to be encoded as a P picture and there are two candidate reference pictures, steps 300-316 are performed twice to set weighted prediction factors for each reference picture. And, if the input picture is to be encoded as a B pictures and there are two candidate forward reference pictures and two candidate backward reference pictures, steps 300-316 are performed four times to set weighted prediction factors for each of the four reference pictures. Then, as the current picture is encoded, the weighted prediction factors for each reference picture are used.

For example, in some embodiments of the invention, each 8×8 block in P picture can have multiple candidate reference pictures. During motion estimation, a single reference picture of the candidate is selected that provides the best prediction image for the block. Similarly, an 8×8 block in B picture can have multiple candidate reference pictures in forward and backward directions. Based on prediction performance, one forward reference picture and one backward reference picture are chosen from the candidate forward or backward reference pictures. In bi-directional prediction mode, the block can use two reference pictures (best one from forward and best one from backward) by averaging the two reference picture. The weighted prediction image for reference picture n can be obtained as follows: weighted_prediction_image(n)=w(n)*prediction image+offset(n) where w(n) and offset (n) are the weighted prediction parameters for reference picture n. Bi-directional weighted prediction can be obtained as follows: image weighted_prediction_image_combined=average of weighted_prediction_image_F(n) and weighted_prediction_image_B(n), where weighted_prediction_image_F(n)=w_F(n)*prediction_image_F+offset_F(n) and weighted_prediction_image_B(p)=w_B(p)*prediction_image_B+offset_B(p), where n and p are the best forward and backward reference pictures, w_F(n) and offset_F(n) are the weighted prediction parameters for forward reference picture n, and w_B(p) and offset_B(p) are the weighted prediction parameters for backward reference picture p.

Experiments were performed to compare the performance in encoding fade-in-fade-out WVGA video sequences and normal HD video sequences using weighted prediction and an embodiment of the above method, using weighted prediction without the method, and without using weighted prediction. In the method embodiment, the current input picture and the reference pictured were divided into four rectangular regions of pixels of the same size, the region brightness threshold, Rthresh, was set to 2 and the global brightness threshold, Gthresh, was set to 3. Further, the fade-in-fade-out WVGA sequences and normal HD sequences were encoded using an IPPP coding structure and quantization parameters QP=25, 30, 35 and 40.

Table 1 shows the PSNR (peak signal-to-noise ratio) improvements between using weighted prediction (2) and not using (1) weighted prediction and between using weighted prediction with the method (3) and not using weighted prediction (1) for coding fade-in-fade-out WVGA video sequences. In this table, positive and negative numbers mean quality improvement and quality loss, respectively. These results show that even though the use of weighted prediction improved quality significantly in many of the fade-in-fade-out sequences, it also decreased quality in several of the sequences up to −0.61 dB. Further, the use of weighted prediction with the method reduced quality loss for such sequences and improved the average quality.

TABLE 1

| Sequences | PSNR improvement | |
|---|---|---|
| | (1)-(2) | (1)-(3) |
| 28weekslaterfade__p854x480__24fps__420pl__150fr | −0.33 | −0.29 |
| 1408fade__p854x480__24fps__420pl__150fr | 1.33 | 0.82 |
| 10000bcfade__p854x480__24fps__420pl__150fr | −0.13 | −0.06 |
| astroboyfade__p854x480__24fps__420pl__150fr | 0.56 | 0.83 |
| elizabeththegoldenagefade__p854x480__24fps__420pl__150fr | 0.18 | 0.16 |
| guardianfade__p854x480__24fps__420pl__150fr | −0.61 | −0.24 |
| invinciblefade__p854x480__24fps__420pl__150fr | 0.81 | 1.09 |
| prestigefade__p854x480__24fps__420pl__150fr | 1.40 | 1.25 |
| quantumofsolacefade__p854x480__24fps__420pl__150fr | 1.86 | 1.85 |
| speedracerfade__p854x480__24fps__420pl__150fr | 0.14 | 0.18 |
| Average | 0.52 | 0.56 |
| Max | 1.86 | 1.85 |
| Min | −0.61 | −0.29 |

Table 2 shows the PSNR improvements between using weighted prediction (2) and not using (1) weighted prediction and between using weighted prediction with the method (3) and not using weighted prediction (1) for coding normal HD video sequences. The effect of the method is more evident here. These results show that applying weighted prediction without the method could result in significant quality loss for normal HD video sequences.

TABLE 2

| Sequences | PSNR improvement | |
|---|---|---|
| | (1)-(2) | (1)-(3) |
| catriverbedvipertrain__p1920x1080__24fps__420pl__60fr | −0.06 | 0.00 |
| sbreach__p1920x1080__30fps__420pl__60fr | −0.37 | 0.01 |
| sfadevipertraffic__p1920x1080__24fps__420pl__58fr | −0.02 | 0.00 |
| sfountain__p1920x1080__30fps__420pl__30fr | 0.00 | 0.00 |
| sIceHockey__p1920x1080__30fps__420pl__60fr | −0.21 | 0.00 |
| sjuggle__p1920x1080__30fps__420pl__60fr | −0.23 | 0.00 |
| smaninrest__p1920x1080__30fps__420pl__60fr | 0.05 | 0.00 |
| smotionvipertraffic__p1920x1080__24fps__420pl__60fr | −0.41 | 0.00 |
| sPanIceHockey__p1920x1080__30fps__420pl__60fr | −0.65 | 0.00 |
| sriverbed__p1920x1080__30fps__420pl__30fr | 0.00 | 0.00 |
| ssunflower__p1920x1080__30fps__420pl__60fr | −0.30 | 0.00 |
| stractor__p1920x1080__30fps__420pl__60fr | −0.16 | 0.00 |
| svconf101__p1920x1080__30fps__420pl__60fr | −0.55 | 0.00 |
| sviperpouringliquids__p1920x1080__24fps__420pl__30fr | −0.25 | 0.00 |
| svipertrain__p1920x1080__24fps__420pl__30fr | −0.56 | 0.00 |
| snoreservations__p1920x816__25fps__420pl__59fr | −0.94 | −0.02 |
| Average | −0.29 | 0.00 |
| Max | 0.05 | 0.01 |
| Min | −0.94 | −0.02 |

Embodiments of the encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 4:
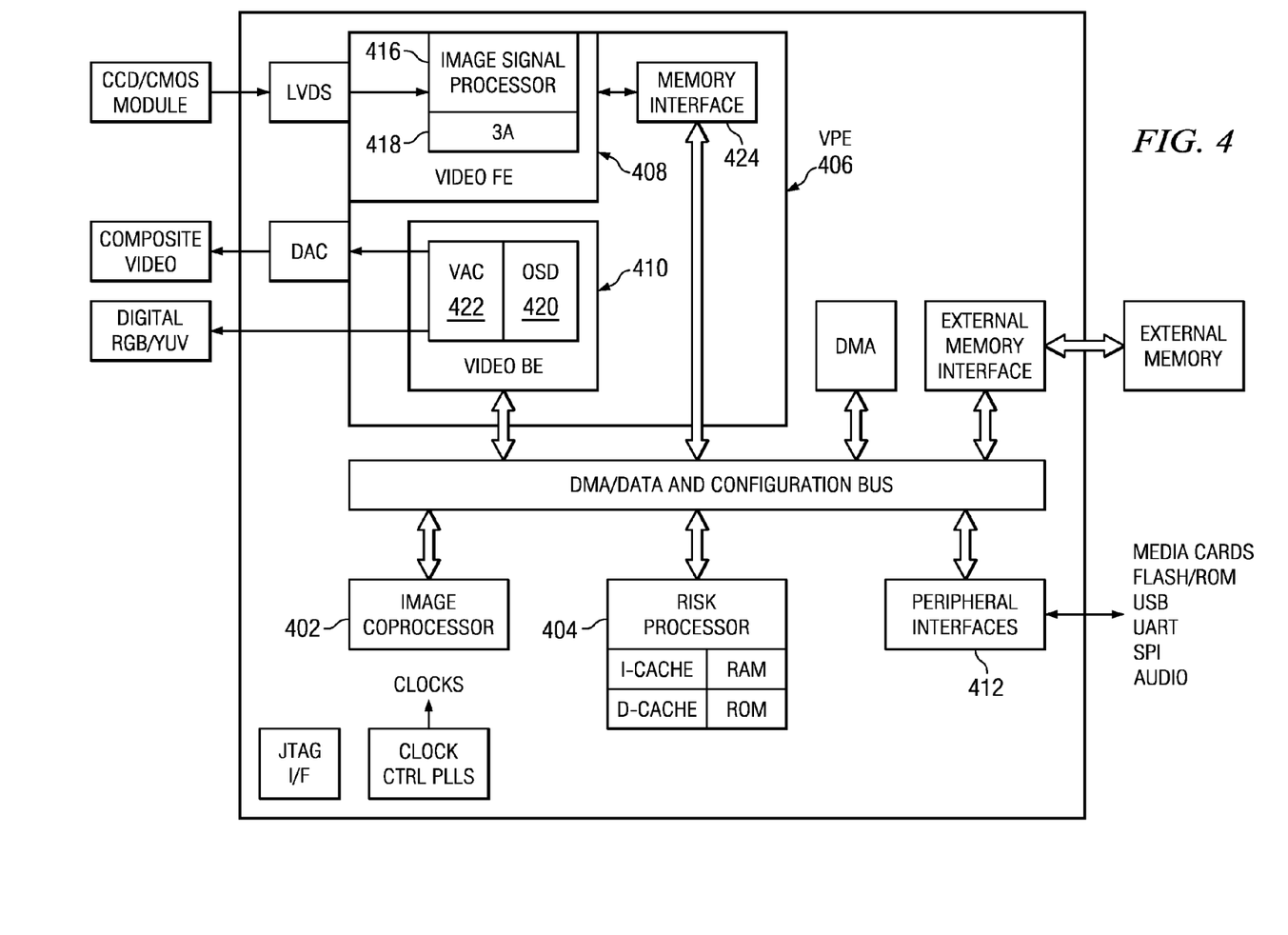
FIGS. 4-6 show illustrative digital systems in accordance with one or more embodiments of the invention.
Figure 5:
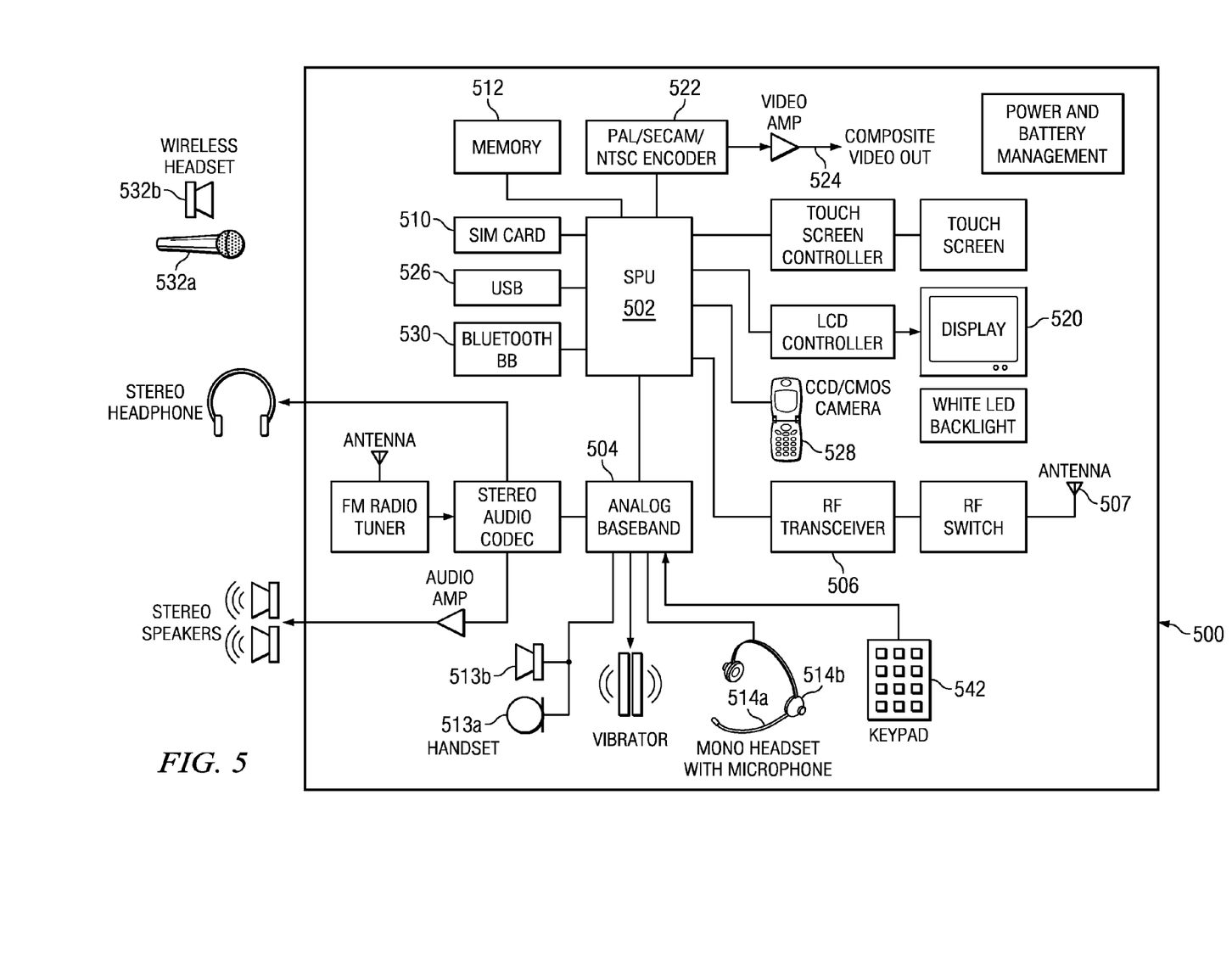
Figure 6:
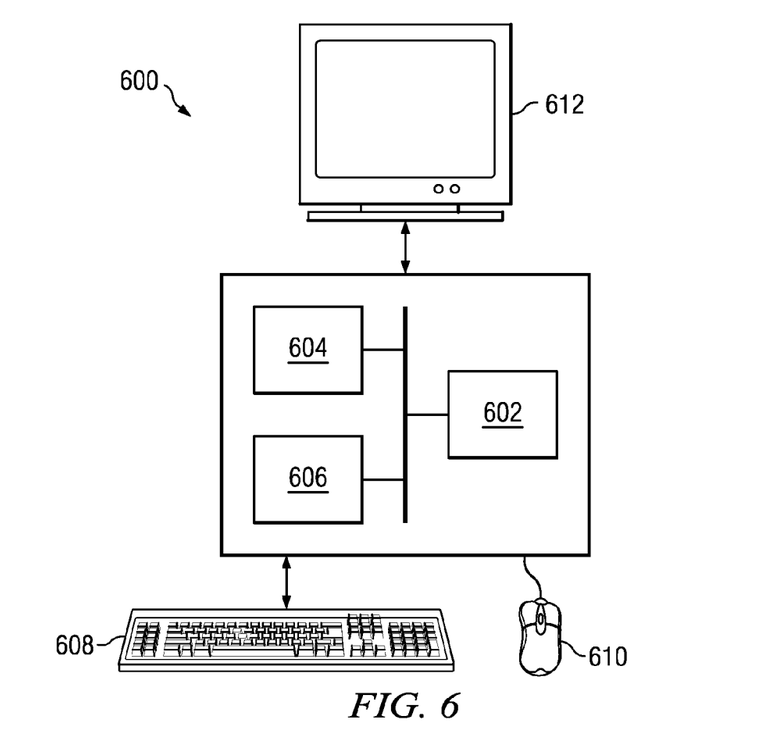

Embodiments of the methods and encoders as described herein may be implemented for virtually any type of digital system (e.g., a desk top computer, a laptop computer, a handheld device such as a mobile (i.e., cellular) phone, a personal digital assistant, a digital camera, etc.) with functionality to capture or otherwise generate digital video sequences. FIGS. 4-6 show block diagrams of illustrative digital systems.

FIG. 4 shows a digital system suitable for an embedded system (e.g., a digital camera) in accordance with one or more embodiments of the invention that includes, among other components, a DSP-based image coprocessor (ICP) (402), a RISC processor (404), and a video processing engine (VPE) (406) that may be configured to perform methods as described herein. The RISC processor (404) may be any suitably configured RISC processor. The VPE (406) includes a configurable video processing front-end (Video FE) (408) input interface used for video capture from imaging peripherals such as image sensors, video decoders, etc., a configurable video processing back-end (Video BE) (410) output interface used for display devices such as SDTV displays, digital LCD panels, HDTV video encoders, etc, and memory interface (424) shared by the Video FE (408) and the Video BE (410). The digital system also includes peripheral interfaces (412) for various peripherals that may include a multimedia card, an audio serial port, a Universal Serial Bus (USB) controller, a serial port interface, etc.

The Video FE (408) includes an image signal processor (ISP) (416), and a 3 A statistic generator (3 A) (418). The ISP (416) provides an interface to image sensors and digital video sources. More specifically, the ISP (416) may accept raw image/video data from a sensor (CMOS or CCD) and can accept YUV video data in numerous formats. The ISP (416) also includes a parameterized image processing module with functionality to generate image data in a color format (e.g., RGB) from raw CCD/CMOS data. The ISP (416) is customizable for each sensor type and supports video frame rates for preview displays of captured digital images and for video recording modes. The ISP (416) also includes, among other functionality, an image resizer, statistics collection functionality, and a boundary signal calculator. The 3 A module (418) includes functionality to support control loops for auto focus, auto white balance, and auto exposure by collecting metrics on the raw image data from the ISP (416) or external memory.

The Video BE (410) includes an on-screen display engine (OSD) (420) and a video analog encoder (VAC) (422). The OSD engine (420) includes functionality to manage display data in various formats for several different types of hardware display windows and it also handles gathering and blending of video data and display/bitmap data into a single display window before providing the data to the VAC (422) in YCbCr format. The VAC (422) includes functionality to take the display frame from the OSD engine (420) and format it into the desired output format and output signals required to interface to display devices. The VAC (422) may interface to composite NTSC/PAL video devices, S-Video devices, digital LCD devices, high-definition video encoders, DVI/HDMI devices, etc.

The memory interface (424) functions as the primary source and sink to modules in the Video FE (408) and the Video BE (410) that are requesting and/or transferring data to/from external memory. The memory interface (424) includes read and write buffers and arbitration logic.

The ICP (402) includes functionality to perform the computational operations required for video encoding and other processing of captured images. The video encoding standards supported may include one or more of the JPEG standards, the MPEG standards, and the H.26x standards. In one or more embodiments of the invention, the ICP (402) is configured to perform computational operations of a method for detecting global brightness change for weighted prediction as described herein.

In operation, to capture an image or video sequence, video signals are received by the video FE (408) and converted to the input format needed to perform video encoding. The video data generated by the video FE (408) is stored in then stored in external memory. The video data is then encoded by a video encoder and stored in external memory. During the encoding, a method for detecting global brightness change for weighted prediction as described herein may be used. The encoded video data may then be read from the external memory, decoded, and post-processed by the video BE (410) to display the image/video sequence.

FIG. 5 is a block diagram of a digital system (e.g., a mobile cellular telephone) (500) that may be configured to perform methods described herein. The signal processing unit (SPU) (502) includes a digital signal processing system (DSP) that includes embedded memory and security features. The analog baseband unit (504) receives a voice data stream from handset microphone (513*a*) and sends a voice data stream to the handset mono speaker (513*b*). The analog baseband unit (504) also receives a voice data stream from the microphone (514*a*) and sends a voice data stream to the mono headset (514*b*). The analog baseband unit (504) and the SPU (502) may be separate ICs. In many embodiments, the analog baseband unit (504) does not embed a programmable processor core, but performs processing based on configuration of audio paths, filters, gains, etc being setup by software running on the SPU (502).

The display (520) may also display pictures and video streams received from the network, from a local camera (528), or from other sources such as the USB (526) or the memory (512). The SPU (502) may also send a video stream to the display (520) that is received from various sources such as the cellular network via the RF transceiver (506) or the camera (526). The SPU (502) may also send a video stream to an external video display unit via the encoder (522) over a composite output terminal (524). The encoder unit (522) may provide encoding according to PAL/SECAM/NTSC video standards.

The SPU (502) includes functionality to perform the computational operations required for video encoding and decoding. The video encoding standards supported may include, for example, one or more of the JPEG standards, the MPEG standards, and the H.26x standards. In one or more embodiments of the invention, the SPU (502) is configured to perform computational operations of a method for detecting global brightness change for weighted prediction as described herein. Software instructions implementing the method may be stored in the memory (512) and executed by the SPU (502) as part of capturing and/or encoding of digital image data, e.g., pictures and video streams.

FIG. 6 shows a digital system (600) (e.g., a personal computer) that includes a processor (602), associated memory (604), a storage device (606), and numerous other elements and functionalities typical of digital systems (not shown). In one or more embodiments of the invention, a digital system may include multiple processors and/or one or more of the processors may be digital signal processors. The digital system (600) may also include input means, such as a keyboard (608) and a mouse (610) (or other cursor control device), and output means, such as a monitor (612) (or other display device). The digital system (600) may also include an image capture device (not shown) that includes circuitry (e.g., optics, a sensor, readout electronics) for capturing video sequences. The digital system (600) may include a video encoder with functionality to perform a method for detecting global brightness change for weighted prediction as described herein. The digital system (600) may be connected to a network (614) (e.g., a local area network (LAN), a wide area network (WAN) such as the Internet, a cellular network, any other similar type of network and/or any combination thereof) via a network interface connection (not shown).

Those skilled in the art will appreciate that the input and output means may take other forms.

Further, those skilled in the art will appreciate that one or more elements of the aforementioned digital system (600) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (600) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of encoding a coding unit of a digital video sequence, the method comprising:
    computing a brightness measure for each region in a plurality of regions in the coding unit, wherein the brightness measure indicates a relative brightness between the region in the coding unit and a corresponding region in a reference coding unit,
    wherein each region comprises a plurality of pixels;
    determining a number of regions in the plurality of regions with significant brightness change by comparing each brightness measure to a region brightness change threshold;
    wherein computing the brightness measure further comprises:
        computing a first mean pixel value of the region in the coding unit;
        computing a second mean pixel value of the corresponding region in the reference coding unit; and
        computing the brightness measure as an absolute difference between the first mean pixel value and the second mean pixel value,
    detecting whether there is global brightness change in the coding unit by comparing the number of regions to a global brightness threshold; and
    only when the global brightness change is detected, computing weighted prediction factors to be used for weighted prediction in encoding the coding unit, and
    only when the global brightness change is not detected, providing default values for weighted prediction factors that will have no effect when used for weighted prediction in encoding the coding unit,
    wherein a value of the global brightness threshold depends on a number of regions in the plurality of regions.

2. The method of claim 1, wherein the reference coding unit is a previous original coding unit in the digital video sequence.

3. The method of claim 1, wherein the reference coding unit is a subsequent original coding unit in the digital video sequence.

4. The method of claim 1, further comprising:
    encoding the coding unit using the weighted prediction factors.

5. A video encoder configured to encode a coding unit of a digital video sequence using weighted prediction, the video encoder comprising:
    a memory configured to store a reference coding unit to be used in encoding the coding unit;
    a brightness change estimation component configured to detect whether there is global brightness change in the coding unit by computing a brightness measure for each region in a plurality of regions in the coding unit, wherein the brightness measure indicates a relative brightness between the region in the coding unit and a corresponding region in the reference coding unit, wherein each region comprises a plurality of pixels,
    wherein computing the brightness measure further comprises:
        computing a first mean pixel value of the region in the coding unit;
        computing a second mean pixel value of the corresponding region in the reference coding unit; and
        computing the brightness measure as an absolute difference between the first mean pixel value and the second mean pixel value,
    determining a number of regions in the plurality of regions with significant brightness change by comparing each brightness measure to a region brightness change threshold; and
    detecting whether there is global brightness change in the coding unit by comparing the number of regions to a global brightness threshold; and
    a weighted prediction factors computation component configured to compute weighted prediction factors, the weighted prediction factors computation component computes the weighted prediction factors only when the global brightness change is detected, the weighted prediction factors to be used for weighted prediction in encoding the coding unit; and
    only when the global brightness change is not detected, providing default values for weighted prediction factors that will have no effect when used for weighted prediction in encoding the coding unit.

6. The video encoder of claim 5, wherein the reference coding unit is a previous original coding unit in the digital video sequence.

7. The video encoder of claim 5, wherein the reference coding unit is a subsequent original coding unit in the digital video sequence.

8. A digital system configured to encode a coding unit of a digital video sequence using weighted prediction, the digital system comprising:
    means for storing a reference coding unit to be used in encoding the coding unit;
    means for computing a brightness measure for each region in a plurality of regions in the coding unit, wherein the brightness measure indicates a relative brightness between the region in the coding unit and a corresponding region in the reference coding unit, wherein each region comprises a plurality of pixels;
means for determining a number of regions in the plurality of regions with significant brightness change by comparing each brightness measure to a region brightness change threshold; and
means for detecting whether there is global brightness change in the coding unit by comparing the number of regions to a global brightness threshold; and
means for computing weighted prediction factors, the weighted prediction factors computation component computes the weighted prediction factors only when the global brightness change is detected, the weighted prediction factors to be used for weighted prediction in encoding the coding unit, and only when the global brightness change is not detected, providing default values for weighted prediction factors that will have no effect when used for weighted prediction in encoding the coding unit;

wherein the means for computing the brightness measure compute the brightness measure by:
  computing a first mean pixel value of the region in the coding unit;
  computing a second mean pixel value of the corresponding region in the reference coding unit; and
  computing the brightness measure as the absolute difference between the first mean pixel value and the second mean pixel value.

9. The digital system of claim 8, wherein the reference coding unit is a previous original coding unit in the digital video sequence.

10. The digital system of claim 8, further comprising means for encoding the coding unit using the weighted prediction factors.

* * * * *